June 29, 1948.  D. W. MAIN  2,444,137
VALVE
Filed March 25, 1947
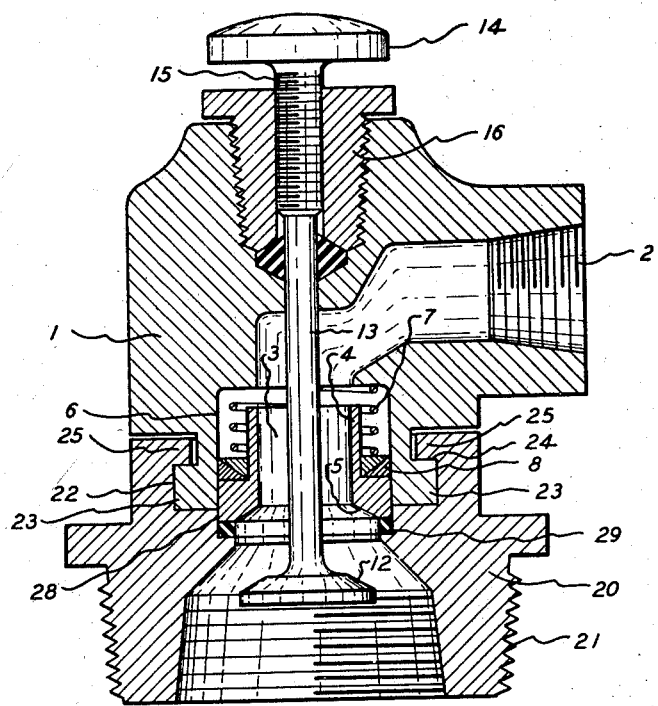
FIG. I.
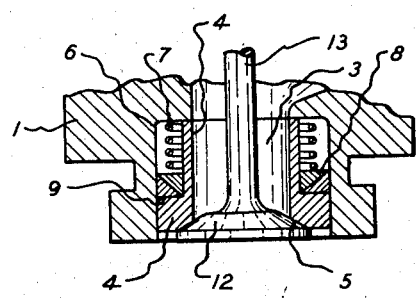
FIG. II.
Inventor
DONALD W. MAIN
By Beaman & Patch
Attorneys Patented June 29, 1948

2,444,137

UNITED STATES PATENT OFFICE 2,444,137

VALVE

Donald W. Main, Jackson, Mich., assignor to Aeroquip Corporation, Jackson, Mich., a corporation of Michigan Application March 25, 1947, Serial No. 736,989

4 Claims. (Cl. 284—18)

1

The present invention relates to a coupling and more particularly to a quickly disconnectable coupling between a valve in a conduit and an extension thereof. One application for the invention is for connecting any fluid conducting conduit or hose to a valved outlet.

In conventional arrangements of the character set forth above, a threaded female coupling member is attached to a threaded male coupling on the valve and the valve is actuated independently of any relationship to the coupling. According to the present invention, the threaded feature of the conventional coupling is eliminated and there is substituted an interlocking quick disconnecting coupling which is locked in fixed relationship to the valve upon the opening of the valve, and conversely, is unlocked upon the closing of the valve.

An object of the present invention is to provide a coupling of the character described wherein a quick disconnecting coupling is locked and unlocked by actuation of a valve controlling the flow of fluid through the coupling.

Another object of the invention is to provide a coupling of the character described having a valve member and a connecting member wherein the connecting member is locked to the valve member by a portion of the valve mechanism upon the opening of the valve.

Still another object of the invention is to provide a valve member and a connector arranged to be locked to the valve member, the valve member and connector having interlocking portions and being locked against disengagement by a portion of the valve structure upon the opening of the valve.

These and other objects residing in the arrangement, combination and construction of the parts will be apparent from the following specification when taken with the accompanying drawings, in which Fig. I is a vertical section through the valve and coupling according to the present invention, showing the parts in locked relation, and Fig. II is a portion of a vertical section of the valve corresponding to that shown in Fig. I, but showing valve portions in closed position and thus out of locking relation.

Referring particularly to the drawing, the reference character 1 indicates a valve body having an inlet 2 and outlet 3. The outlet 3 is defined by a sleeve 4 having as a part thereof the valve seat 5. The sleeve 4 and thus the valve seat 5 is vertically movable in a cylindrical cavity 6 and is urged in a downward direction as

2 viewed in Fig. I by an helical spring 7. The spring 7 bears at the top against the valve body 1 and at the bottom against packing ring 8. The packing ring 8 in turn bears against a shoulder 9 of the sleeve 4. The valve, as a whole, is closed by a valve member 12 on a valve stem 13, which is provided with a handle 14. The valve stem 13 is provided with a threaded portion 15 which is threadably engaged in a bushing 16 in the body 1. Thus rotation of the handle 14 causes the valve member 12 to move upwardly or downwardly depending upon the direction of rotation of the handle 14. It will be apparent from observation of Fig. I that the valve seat 5 and the sleeve 4 will be thrust out of the cylindrical cavity 6 by the spring 7, unless retained therein by the valve member 12.

As shown in Fig. I, the valve body has associated therewith a connector 20, to which may be secured in a suitable or conventional manner as by threads 21, a hose, pipe or other type of fluid conductor for receiving fluids from the valve inlet 2, the flow of fluid being controlled by the valve member 12.

Connector 20 is provided with parallel ways 22 into which project parallel bars 23 comprising a portion of the body 1. The bars 23 are provided with horizontal shoulders 24 which are overlapped by shoulders 25 on the connector 20. Thus the connector 20 may be engaged with the valve body 1 by sliding the same with the shoulders 24 and 25 in overlapping relation in direction normal to the plane of the section of Fig. I.

The structure described thus far provides a coupling between the connector 20 and the valve body 1 but does not prevent accidental disengagement thereof. Such accidental disengagement is guarded against by providing in the connector 20 an annular recess 28 having a diameter such as to snugly receive the lower end of the sleeve 4 and valve seat 5. At the bottom of the recess 28 is a packing 29.

In the operation on the invention the connector 20 is attached to the valve body 1 as above described with the valve member 12 in elevated position as shown in Fig. II, so as to have the sleeve 4 and valve seat 5 withdrawn fully within the confines of the cavity 6. When the connection has been made between the connector 20 and the valve body 1, rotation of the handle 14 in an appropriate direction will lower the valve member 12 with the result that the seat 5 will follow down the valve member 12 until the sleeve 4 engages with the packing 29. This engagement not only seals the interior of the conduit provided by the sleeve 4 and the interior of the connector 20 against the leakage of fluid but also insures that the sleeve 4 is seated in the recess 28 to lock the connector 20 against accidental or undesired movement from the valve body 1. At the same time the valve seat 5 is prevented from further downward movement under the action of the spring 7 so that the valve member 12 moves away therefrom to open the valve and permit the free flow of fluid from the inlet 2 outwardly through the connector 20.

While I have shown in the drawing for the purpose of describing my invention overlapping shoulders 24 and 25 in cooperation with ways 22 and bars 23 for providing a coupling between the connector 20 and the valve body 1, I do not wish to be limited by this particular form of coupling as other equivalent couplings are considered to be fully substitutable for the purposes of the present invention.

Having thus described my invention what I desire to secure by Letters Patent and claim is:

1. In combination, a valve, a coupling portion fixed with respect to said valve, a coupling member complementary to said coupling portion, said coupling portion and coupling member being movable into interlocking relation, said valve having a movable seat member and a valve member, and means to yieldingly urge said seat member against said valve member, said coupling member having a recess, said valve seat member and said recess being in alignment when said coupling portion and coupling member are in interlocking relation, whereby said valve seat member is urged into said recess, upon opening of said valve, to lock said coupling portion and coupling member in engagement.

2. In combination, a valve, a coupling portion fixed with respect to said valve, a coupling member complementary to said coupling portion, said coupling portion and coupling member being movable into interlocking relation, a sleeve comprising a part of said valve, said sleeve being slidable in said body, a valve seat defined by a part of said sleeve, means for yieldably projecting said sleeve from said body, and a valve member adapted to engage said seat to close the valve and to urge said sleeve against said means, said coupling member having a recess, said sleeve and said recess being in alignment when said coupling portion and coupling member are in interlocking relation, whereby said sleeve is urged into said recess, upon opening of said valve, to lock said coupling portion and coupling member in engagement.

3. In combination, a valve body having a coupling portion, said portion comprising a pair of ways, a coupling member having a pair of slides complementary to said ways and movable into interlocking relation with said ways to hold said coupling portion and said coupling member together, said coupling member having a recess between said slides, a valve in said body, and a portion carried by said valve, movable into said recess, upon the opening of said valve to lock said ways and slides in interlocking relation.

4. In combination, a valve, a coupling portion fixed with respect to said valve, a coupling member complementary to said coupling portion, said coupling portion and coupling member being movable into interlocking relation, an axially movable valve seat member mounted in said body, yieldable means to move said seat member outwardly of said body, a valve member movable against said seat member to close the valve and to move said seat member axially inwardly of said body, said coupling member having a recess, said seat member and said recess being in alignment when said coupling portion and coupling member are in interlocking relation, whereby said seat member is urged into said recess, upon opening of said valve, to lock said coupling portion and coupling member in engagement.

DONALD W. MAIN.

REFERENCES CITED

The following references are of record in the file of this patent:

UNITED STATES PATENTS

| Number | Name | Date |
|---|---|---|
| 779,479 | Howell | Jan. 10, 1905 |
| 1,828,934 | Kramer | Oct. 27, 1931 |